(12) United States Patent
Zanella et al.

(10) Patent No.: US 9,393,701 B2
(45) Date of Patent: Jul. 19, 2016

(54) MAGNETIC DEVICE FOR GRIPPING AND CLAMPING WORKPIECES

(75) Inventors: Alessandro Zanella, Orbassano (IT); Tommaso Luchetti, Orbassano (IT); Antonella Turi, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 410 days.

(21) Appl. No.: 14/003,638

(22) PCT Filed: Mar. 7, 2012

(86) PCT No.: PCT/IB2012/051065
§ 371 (c)(1),
(2), (4) Date: Sep. 6, 2013

(87) PCT Pub. No.: WO2012/123856
PCT Pub. Date: Sep. 20, 2012

(65) Prior Publication Data
US 2013/0341845 A1    Dec. 26, 2013

(30) Foreign Application Priority Data
Mar. 16, 2011    (EP) ..................... 11158534

(51) Int. Cl.
*B25J 15/06*    (2006.01)
*F03G 7/06*    (2006.01)
*B23Q 3/15*    (2006.01)
(Continued)

(52) U.S. Cl.
CPC ........... *B25J 15/0608* (2013.01); *B23Q 3/1546* (2013.01); *B25J 9/1085* (2013.01); *F03G 7/065* (2013.01); *H01F 7/04* (2013.01)

(58) Field of Classification Search
CPC .. B25B 11/002; B25B 11/005; B25J 15/0608; B25J 9/1085; B23Q 3/1546; F03G 7/065; H01F 7/04
USPC ............... 60/527–529; 335/215, 285; 310/26, 310/307; 337/139, 140, 382, 395
See application file for complete search history.

(56) References Cited

U.S. PATENT DOCUMENTS 2,976,075 A * 3/1961 Budreck ................. B03C 1/284
294/65.5
4,121,865 A * 10/1978 Littwin, Sr. ........... B66C 1/0218
294/186
(Continued)

FOREIGN PATENT DOCUMENTS

DE    102008012688 B3    7/2009
JP    60202053 A    10/1985
WO    2005095254 A1    10/2005

OTHER PUBLICATIONS

International Search Report dated May 9, 2012 from corresponding PCT Application No. PCT/IB2012/051065.

*Primary Examiner* — Joseph J Hail
*Assistant Examiner* — J Stephen Taylor
(74) *Attorney, Agent, or Firm* — Young Basile Hanlon & MacFarlane, P.C.

(57) ABSTRACT

A magnetic device for gripping and clamping workpieces, in particular sheet-steel elements (L), comprises a supporting casing (2), slidably mounted within which is a magnet-holder member (4) carrying a main permanent magnet (M). The magnet-holder member (4) can be displaced between an advanced, operative, position, in which the main magnet (M) is designed to grip and clamp a workpiece (L), and a retracted, inoperative, position. The movement of the magnet-holder member (M) is controlled by shape-memory actuator means (A1, A2, B, E).

5 Claims, 8 Drawing Sheets

(51) Int. Cl.
  *B23Q 3/154*   (2006.01)
  *B25J 9/10*    (2006.01)
  *H01F 7/04*    (2006.01)

(56) References Cited

U.S. PATENT DOCUMENTS

| | | | |
|---|---|---|---|
| 5,306,979 A * | 4/1994 | Schwarz, Jr. | H02N 2/023 310/26 |
| 5,312,152 A * | 5/1994 | Woebkenberg, Jr. | B64G 1/641 294/82.24 |
| 6,005,459 A * | 12/1999 | Hoffman | H01H 51/2209 335/106 |
| 6,015,175 A * | 1/2000 | Carruth | B23Q 3/15 294/192 |
| 6,404,098 B1 * | 6/2002 | Kayama | F03G 7/06 310/307 |
| 6,538,544 B1 * | 3/2003 | Hardy | B66C 1/04 294/192 |
| 2008/0034750 A1 | 2/2008 | Gao | |
| 2012/0017583 A1 * | 1/2012 | Lewis | E21B 33/064 60/529 |

* cited by examiner

FIG. 8

MAGNETIC DEVICE FOR GRIPPING AND CLAMPING WORKPIECES

TECHNICAL FIELD

This disclosure generally relates to devices for gripping and withholding workpieces made of ferromagnetic material, for example sheet-steel elements.

BACKGROUND

The present invention relates to devices for gripping and withholding workpieces made of ferromagnetic material, for example sheet-steel elements, by means of at least one permanent magnet, said device comprising:
- a supporting casing;
- a magnet-holder member, carrying a main permanent magnet and mounted so that it can slide in said supporting casing between an advanced position, corresponding to an operative position of said main magnet, and a retracted position, corresponding to an inoperative position of said main magnet, and
- actuator means carried at least in part by said casing, for governing a displacement of said magnet-holder member between said advanced position and said retracted position.

A device of the type described above is for example illustrated in the document No. DE 10 2008 012 688 B3.

Devices of this type are used in industrial plants, as an alternative to traditional clamping grippers, for clamping metal workpieces or elements made of sheet metal during a machining operation, for example during execution of welding operations.

In the aforesaid known solution, the actuator means that govern the displacement of the magnet-holder member are constituted by a pneumatic cylinder.

SUMMARY

The object of the present invention is to provide a device of the type specified above that has a simple and functional structure, a low cost and reduced encumbrance.

With a view to achieving said purpose, the subject of the invention is a device having the characteristics referred to at the start and moreover characterized in that the aforesaid actuator means for governing displacement of the magnet-holder member comprise:
- shape-memory actuator means, comprising shape-memory actuator elements, which are constituted by a shape-memory metal alloy and are designed to undergo a phase transition when their temperature exceeds a predetermined threshold value; and
- means for supplying an electric current through said shape-memory actuator elements so as to bring their temperature above said threshold value.

Shape-memory metal alloys are known and have been studied for some time. They have the characteristic of undergoing a phase transition, from a martensitic structure to an austenitic structure, when their temperature exceeds a predetermined threshold value. Actuators of this type have been used in a wide range of applications and have formed the subject of numerous patents filed in the name of the same present applicant. In a typical embodiment, a shape-memory actuator is constituted by a wire made of shape-memory metal alloy that undergoes a reduction in length when its temperature exceeds the threshold value. In some applications, it is the very variations of temperature of the environment in which the shape-memory wire is located that determine the transition thereof. More frequently, the transition is governed, as in the case of the present invention, by supplying an electric current through the shape-memory wire, so as to heat it.

According to a further characteristic of the invention, the shape-memory actuator elements that are provided therein comprise:
- first shape-memory actuator elements for governing a displacement of the magnet-holder member from its advanced position to its retracted position; and
- second shape-memory actuator elements for governing a displacement of the magnet-holder member from its retracted position to its advanced position.

Consequently, in the case of the preferred embodiment of the invention, the shape-memory actuator means are double-acting, distinct actuator elements being provided for governing the movement of the magnet-holder member in two opposite directions.

In theory, it is possible to envisage supplying continuously each time the first shape-memory actuator elements or the second shape-memory actuator elements as long as the magnet-holder member governed by them is to be kept in the position reached following upon their activation. A solution of this sort obviously involves an expenditure of energy. In the preferred embodiment, said expenditure of energy is prevented in so far as each of the two extreme positions of the magnet-holder member is a stable position in the sense that it is maintained also when the electric supply to the shape-memory actuator elements is interrupted.

The aforesaid result is obtained, according to the invention, in so far as the magnet-holder member carries the aforesaid main magnet at its front end and moreover bears, in the proximity of its opposite end, an auxiliary magnet, which generates a magnetic field of lower intensity than that of the main magnet. The auxiliary magnet adheres to a metal wall of the casing of the device when the magnet-holder member is in its retracted position so as to keep the magnet-holder member stably in said retracted position even after an interruption of the passage of electric current through said first shape-memory actuator elements that are used for displacing the magnet-holder member towards its retracted position.

In the present description and in the ensuing claims, the terms "front", "rear", "forwards", and "backwards" are used considering the end of the casing of the device that faces the workpiece to be clamped as front end and the opposite end of the casing as rear end.

In the case of the aforesaid preferred embodiment, which envisages the aforesaid auxiliary magnet, the first shape-memory actuator elements are designed to govern a movement backwards of the magnet-holder member equal to the entire length necessary to pass from the operative position of the main magnet to the position where the auxiliary magnet is in contact with the aforesaid wall of the casing. Instead, the aforesaid second shape-memory actuator elements are designed to govern a movement forwards of the magnet-holder member towards its operative position that is equal only to a portion of the aforesaid length, the remaining portion of displacement being obtained via the magnetic attraction between the main magnet and the workpiece to be clamped (given that said attraction cannot be hindered by the auxiliary magnet set at the opposite end of the magnet-holder member in so far as the auxiliary magnet generates a magnetic field of lower intensity than that of the main magnet).

Furthermore, in the case of the preferred embodiment of the invention, the aforesaid shape-memory actuator elements are wires made of shape-memory metal alloy, which extend parallel to the direction of displacement of the magnet-holder member and are designed to undergo a reduction in length following upon overstepping of their threshold temperature.

It should be noted that the reduction in length of a shape-memory wire when it is activated corresponds to a fixed percentage of its initial length. Consequently, in order to obtain a desired reduction in length it is necessary to provide a sufficiently long wire. Consequently, in order to avoid an excessive axial encumbrance of the device, the invention envisages that within the aforesaid casing is slidably mounted an auxiliary member and that the first shape-memory actuator elements, which govern the displacement backwards of the magnet-holder member, comprise a first set of one or more wires made of shape-memory alloy operatively connected between said magnet-holder member and said auxiliary sliding member and a second set of one or more wires made of shape-memory alloy operatively connected between said auxiliary sliding member and the rear side of said casing in such a way that the displacement backwards of the magnet-holder member is obtained following upon both the movement of said magnet-holder member with respect to the auxiliary sliding member, caused by shortening of said first set of shape-memory wires, and the movement of said auxiliary sliding member with respect to said casing, caused by shortening of said second set of shape-memory wires. In this way, the necessary displacement of the magnet-holder member from its advanced position to its retracted position is divided between the shape-memory wires of the first set and those of the second set. Said wires can be at least partially set on top of one another in an axial direction so as to enable a reduction of the overall axial dimension of the device.

In particular, once again in the case of the preferred embodiment, the aforesaid wires made of shape-memory alloy of the first set and of the second set extend through axial channels made through the body of said magnet-holder member and through the body of said auxiliary sliding member and are at least partially set on top of one another in the axial direction. Once again in the case of the preferred example, said auxiliary sliding member has a main portion of larger diameter, mounted so that it can slide within said casing to the rear of said magnet-holder member, and a central axial stem of smaller diameter, mounted so that it can slide within a cylindrical axial cavity of said magnet-holder member, the channels within which the shape-memory wires of the second set extend being made through said main portion and through said stem of the auxiliary sliding member in such a way that the shape-memory wires of the second set extend between the front end of said stem of the auxiliary sliding member and the rear side of the casing, whilst the aforesaid shape-memory wires of the first set extend both through channels made in the body of the magnet-holder member in the part surrounding said cylindrical axial cavity and through axial channels made in the main portion of the auxiliary sliding member, external to said channels containing the shape-memory wires of the second set in such a way that the shape-memory wires of the first set extend between the front end of said magnet-holder member and the rear end of said auxiliary sliding member. Said specific arrangement enables considerable reduction of the axial dimension of the entire device.

According to a further characteristic, the second shape-memory actuator elements, which govern displacement forwards of the magnet-holder member, comprise a third set of one or more wires made of shape-memory alloy operatively connected between the front side of said casing and said magnet-holder member. In this case, it is not necessary to resort to two sets of shape-memory wires arranged in series as in the case of the movement backwards in so far as the length of the movement forwards that is governed by the shape-memory actuator means is smaller, the remaining part of the displacement being obtained simply thanks to the magnetic attraction between the workpiece to be clamped and the main magnet.

As emerges clearly from the foregoing, the device according to the invention presents a series of advantageous characteristics both in terms of operative efficiency and in terms of simplicity and low encumbrance of the structure.

BRIEF DESCRIPTION OF THE DRAWINGS

Further characteristics and advantages of the invention will emerge from the ensuing description with reference to the annexed drawings, which are provided purely by way of non-limiting example and in which.

DETAILED DESCRIPTION

Figure 4:
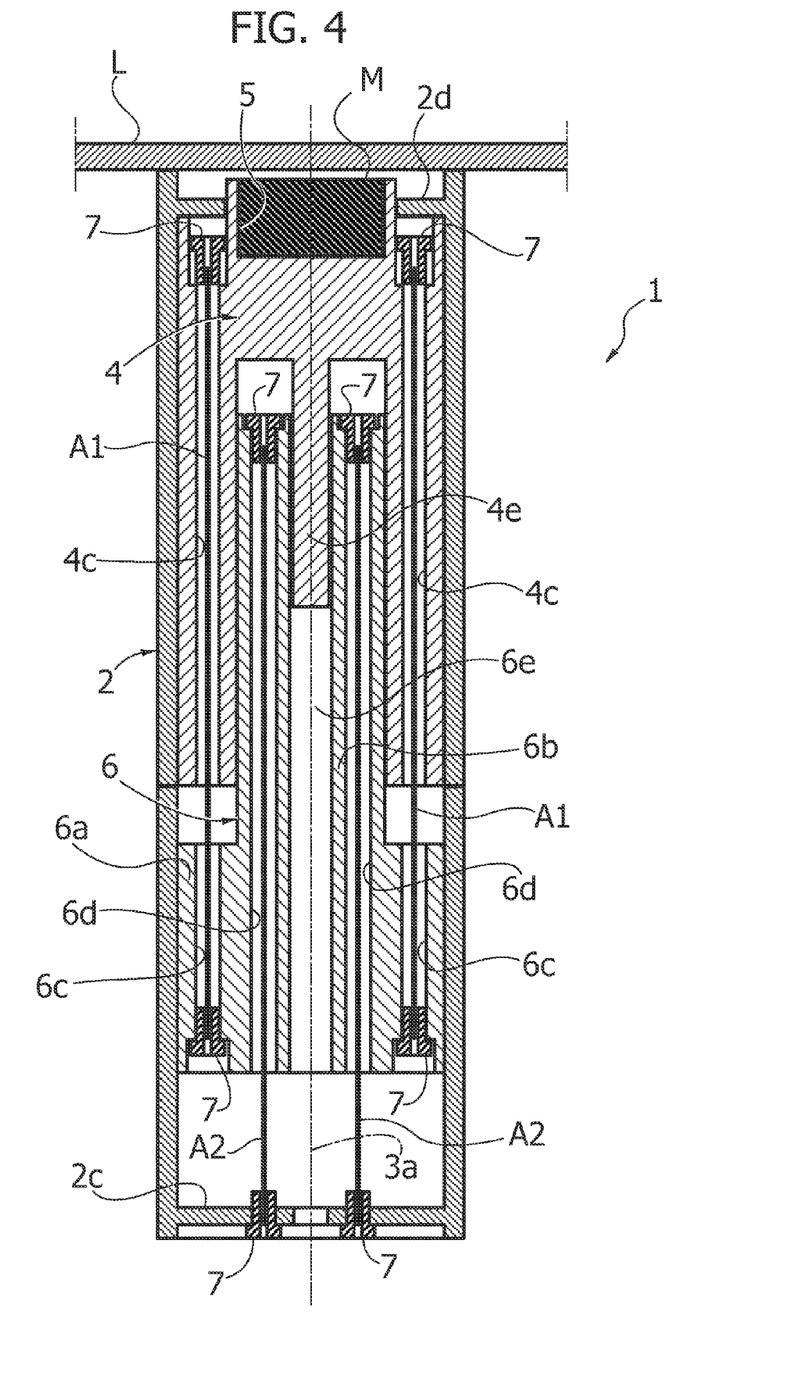
FIG. 4 is a cross-sectional view at an enlarged scale, corresponding to the cross section of FIG. 2, which illustrates the main magnet in its advanced position, for gripping and clamping a sheet-metal element.

In the drawings, the reference number 1 designates as a whole a magnetic device for gripping and clamping workpieces made of ferromagnetic material, typically sheet-steel elements, such as for example the element L illustrated in cross section in FIG. 4. The device is usable in workstations of industrial plants for clamping a piece of sheet metal during a machining operation, for example during the execution of welding operations.

The device 1 comprises a casing 2 made of metal material, constituted by two axially juxtaposed half-shells 2a, 2b, which are fixed together by connection means of any type (not illustrated) and define inside them a cylindrical cavity 3 (see FIG. 4), the axis of which is designated by 3a.

The casing 2 is to be fixed, in any known way and by connection means of any kind (not illustrated) to a supporting structure (which is schematically illustrated in FIG. 4 and is designated by the reference S) in such a way that the device 1 can be used for gripping and withholding a sheet L with respect to said structure S.

Figure 5:
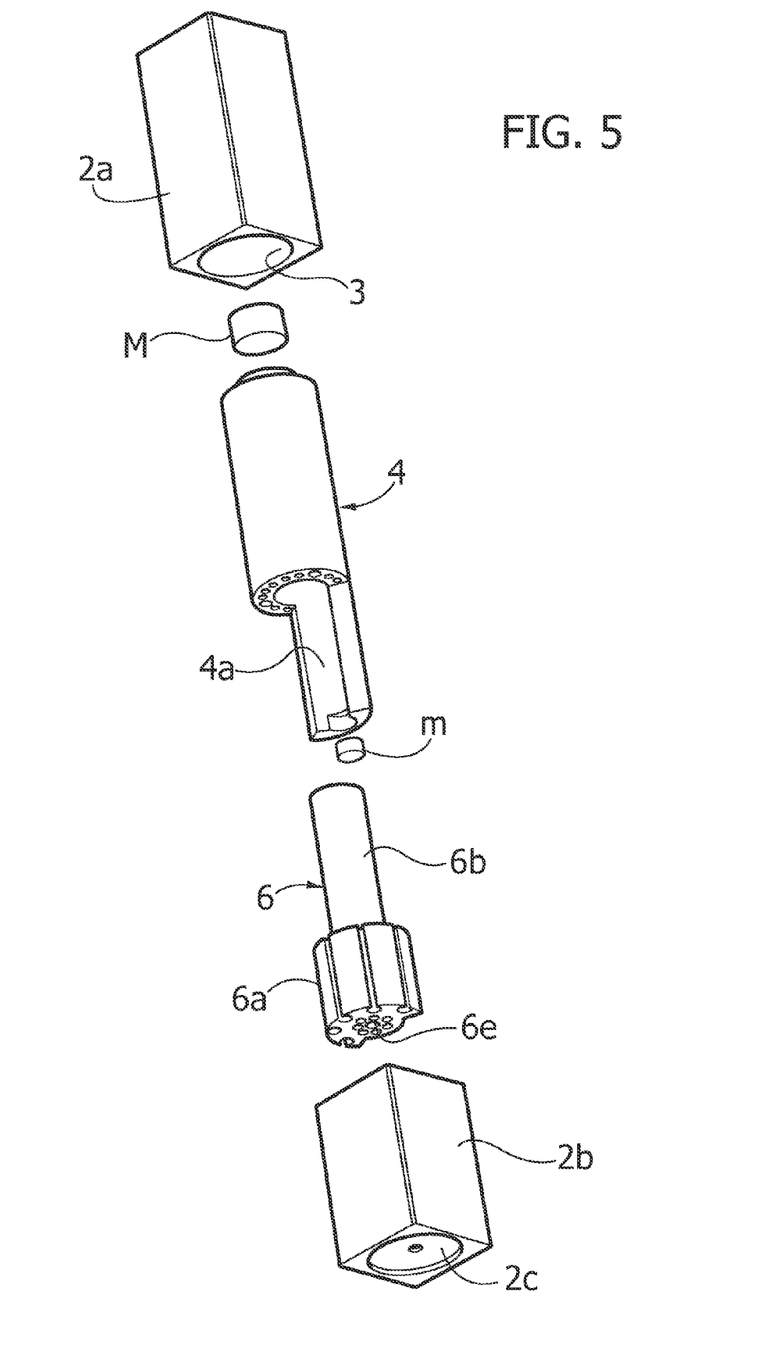
FIG. 5 is an exploded perspective view of the parts making up the device of FIGS. 1-4.
Figure 6:
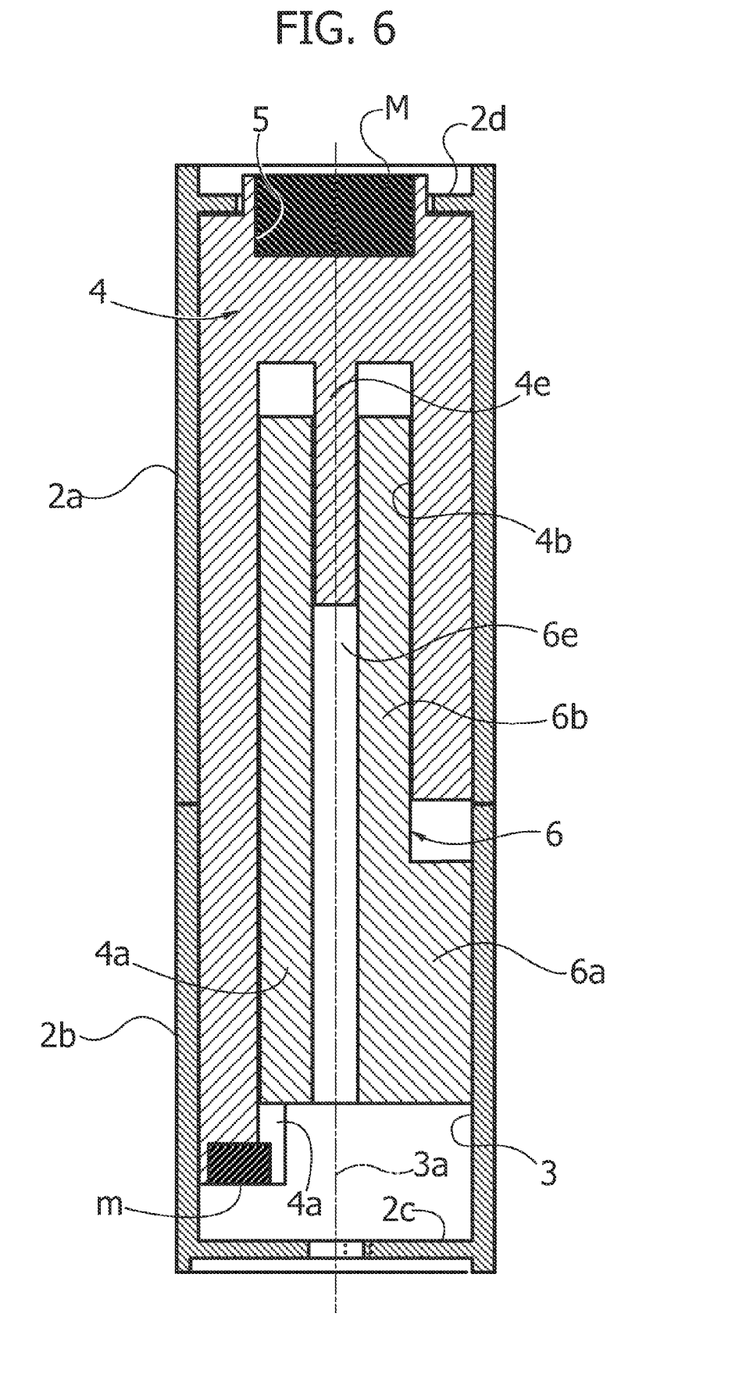
FIGS. 6 and 7 are sections according to the plane VI indicated in FIG. 1, which show the main magnet in its advanced position and in its retracted position, respectively.

Slidably mounted within the cavity 3 is a magnet-holder member 4 having a general tubular cylindrical configuration (see FIG. 5) with a top end closed and an axial extension 4a at the end of the member 4 facing the rear part of the device.

In the present description and in the ensuing claims, the terms "front", "rear", "forwards" and "backwards" are used considering the end of the casing 3, facing the sheet L (FIG. 4), as front end and the opposite end of the casing 2, facing the structure S (FIG. 4), as rear end.

The magnet-holder member 4 carries on its front end a main magnet M, which in the example illustrated is in the form of a cylindrical body with plane opposite faces, received within a seat 5 defined at the front by the body of the magnet-holder member 4. At the distal end of the axial appendage 4a, the magnet-holder member 4 moreover bears an auxiliary magnet m, which is also in the form of a cylindrical body with plane opposite faces. The auxiliary magnet m is of dimensions considerably smaller than those of the main magnet M and gives rise to a magnetic field of intensity considerably lower than that of the magnetic field generated by the main magnet M.

Figure 7:
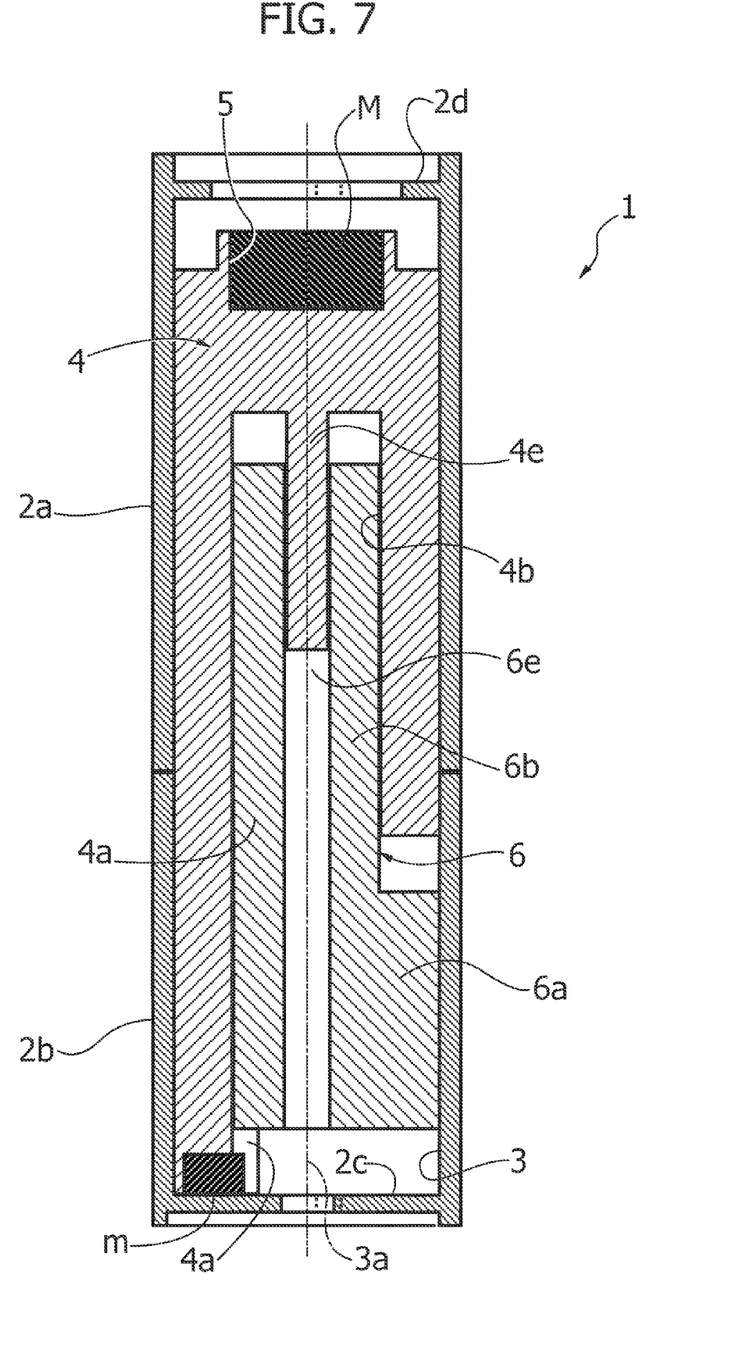
Figure 8:
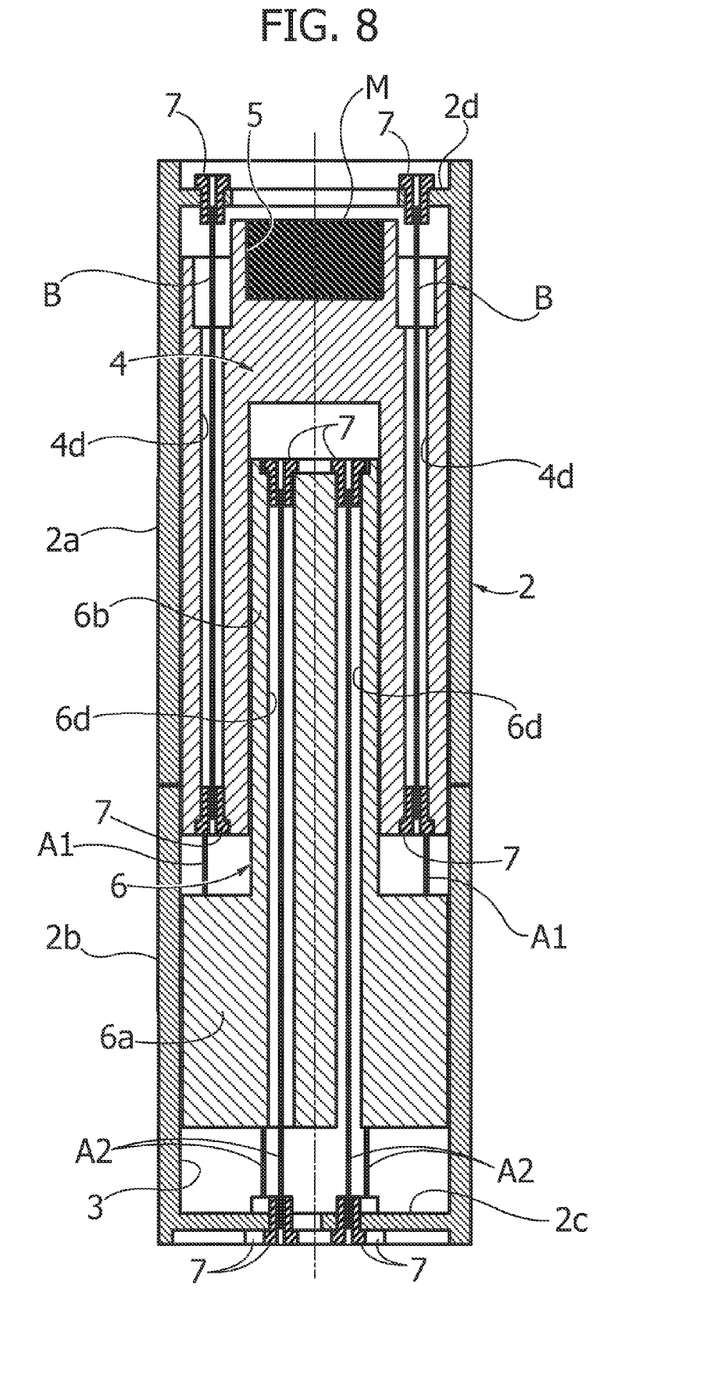
FIG. 8 is a cross section corresponding to that of FIG. 3.

The magnet-holder member 4 can be displaced axially between an advanced position (illustrated in FIGS. 1-3, 4 and 6), in which the main magnet M is in an operative position thereof, where it is able to grip and withhold stably the sheet L (FIG. 4) against the front end of the casing 2, and a retracted position, illustrated in FIGS. 7 and 8, in which the main magnet M is sufficiently distant from the front end of the casing as not to be able to exert an action of clamping on the sheet L, whilst the auxiliary magnet m adheres magnetically against an end-of-travel wall 2c, defined by the casing 2 at its rear end.

In the device according to the invention, the movement of the magnet-holder member 4 between its advanced position and its retracted position is governed by shape-memory actuator means comprising shape-memory actuator elements, which are constituted by a shape-memory metal alloy and are designed to undergo a phase transition when their temperature exceeds a predetermined threshold value.

In the case of the example illustrated, the shape-memory actuator elements are all in the form of wires made of shape-memory metal alloy, designated by the references A1, A2 and B in the annexed drawings.

The shape-memory wires A1 and A2 form part of a set of first shape-memory actuator elements used for governing the displacement backwards of the magnet-holder member 4, i.e., its movement from the advanced position illustrated in FIG. 4 to the retracted position illustrated in FIGS. 7, 8.

The shape-memory wires B constitute second shape-memory actuator elements, which are used for governing the displacement forwards of the magnet-holder member, i.e., its movement from the retracted position to the advanced position. The arrangement and operation of the aforesaid shape-memory wires will be illustrated hereinafter.

In the preferred embodiment of the invention, slidably mounted within the cavity 3 of the casing 2 is an auxiliary member 6. The auxiliary member 6 has a main body 6a, of larger diameter, corresponding to the diameter of the cavity 3, and a central stem 6b that is slidably received within an internal cylindrical cavity 4b of the magnet-holder member 4 (see FIG. 4). The main portion of larger diameter 6a of the auxiliary sliding member 6 is mounted sliding within the cavity 3 of the casing 2 at the rear on the magnet-holder member 4. The stem 6b is further guided by an axial cylindrical pin 4e projecting within the cavity 4b starting from the top end wall of the body of the member 4. The pin 4 is slidably received within an axial cylindrical channel 6e of the auxiliary member 6.

With reference once again to FIG. 4, a first set of shape-memory wires A1 is provided (the drawings show two wires A1 set diametrally opposite to one another, but the invention can be applied also in the case of a single wire A1 or of any number of wires A1), said wires being operatively connected between the front end of the magnet-holder member 4 and the rear end of the auxiliary sliding member 6.

The connection of each end of each shape-memory wire to the respective support is made by means of clamps 7 of any known type, which are illustrated only schematically in the drawings.

As may be seen clearly in FIG. 4, in order to arrange wires A1 of the necessary length, said wires extend through axial channels 4c, 6c made in the body of the magnet-holder member 4 (in the wall that surrounds the cavity 4b) and in the main portion 6a of the auxiliary sliding member 6 (externally with respect to the stem 6b) starting from the front end of the magnet-holder member 4 up to the rear end of the auxiliary sliding member 6.

Moreover provided is a second set of shape-memory wires A2 operatively connected between the front end of the stem 6b of the auxiliary sliding member 6 and the rear wall 2c of the casing 2.

As will emerge clearly also in what follows, the shape-memory wires A1, A2 provide an operative connection in series "magnet-holder member 4—wires A1—auxiliary member 6—wires A2" that enables the entire length of the displacement of recession of the magnet-holder member 4 to be obtained through the reduction in length of the wires A1 and A2. The arrangement of the stem 6b within the magnet-holder member 4 moreover enables an arrangement of the wires A1 and A2 to be obtained, where they are partially set on top of one another in an axial direction, to the further advantage of the axial compactness of the entire device.

Finally, with reference to FIG. 8, two shape-memory wires B are provided (even just one wire B or any other number of wires B may be provided), operatively connected to a front wall 2d of the casing 2 and on the other side to the rear end of the cylindrical portion of the magnet-holder member 4, the wires B also being arranged through axial channels 4d made through the body of the magnet-holder member 4.

Figure 1:
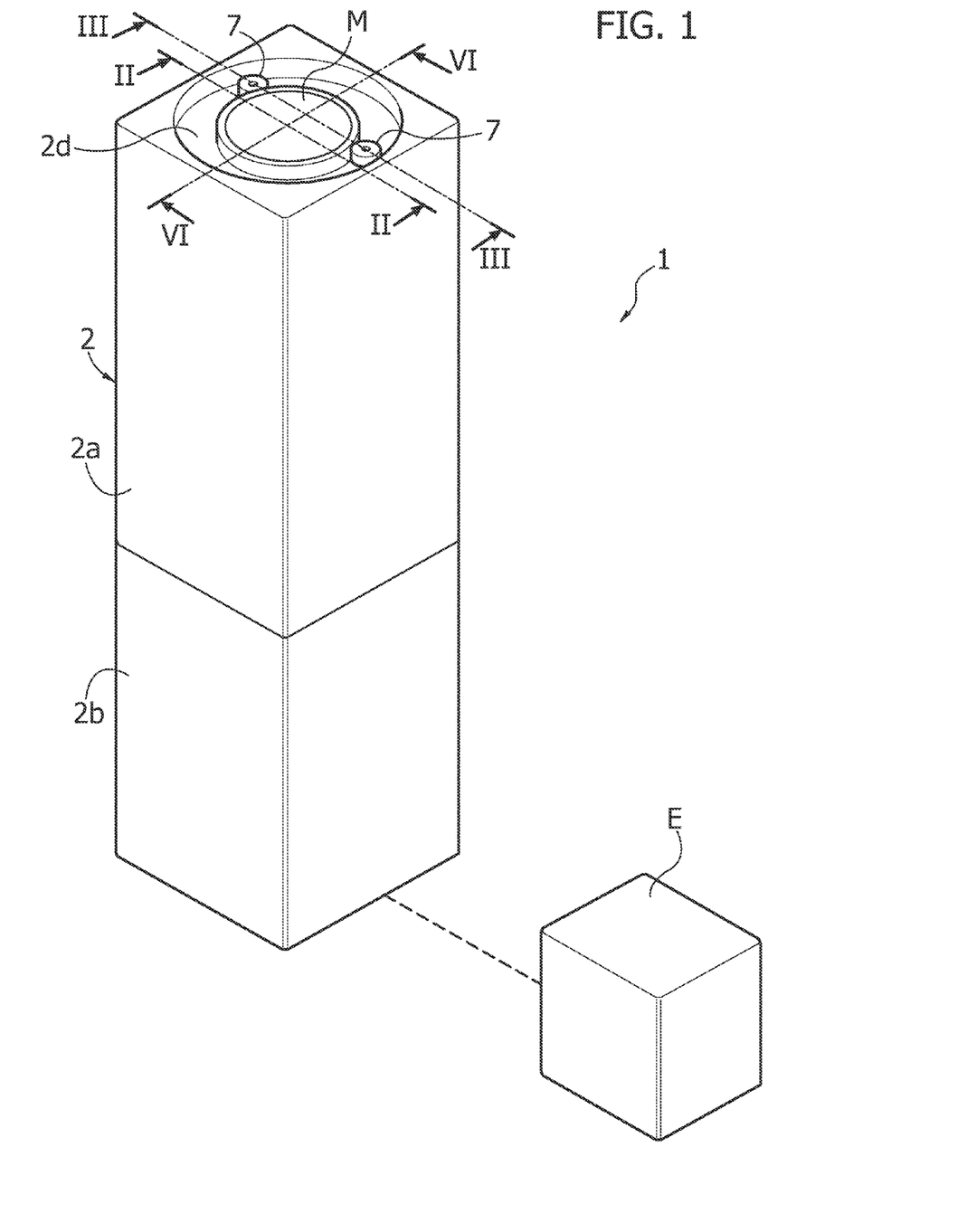
FIG. 1 is a perspective view of a preferred embodiment of the device according to the invention.
Figure 2:
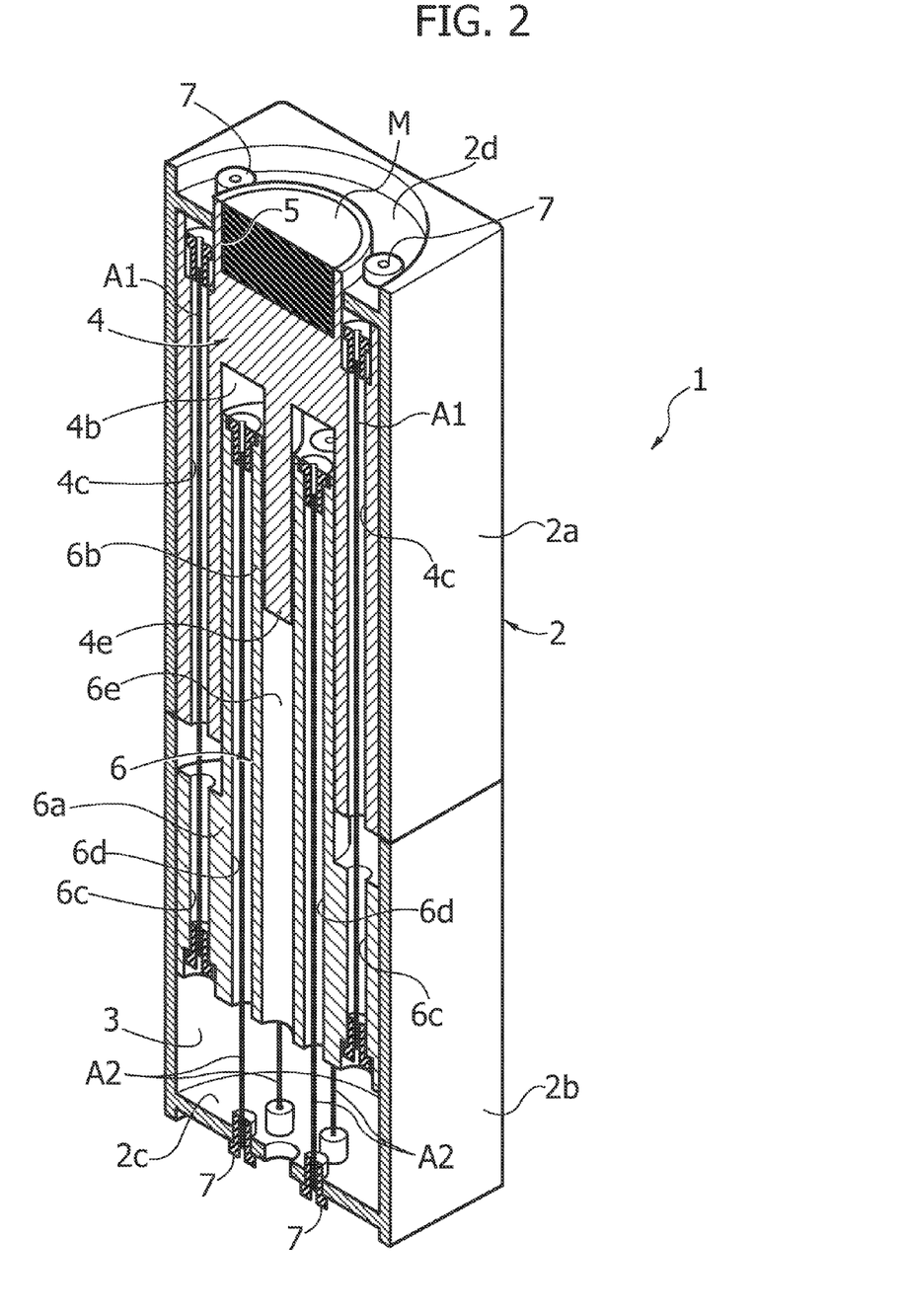
FIGS. 2 and 3 are perspective views sectioned according to the planes II and III indicated in FIG. 1.
Figure 3:
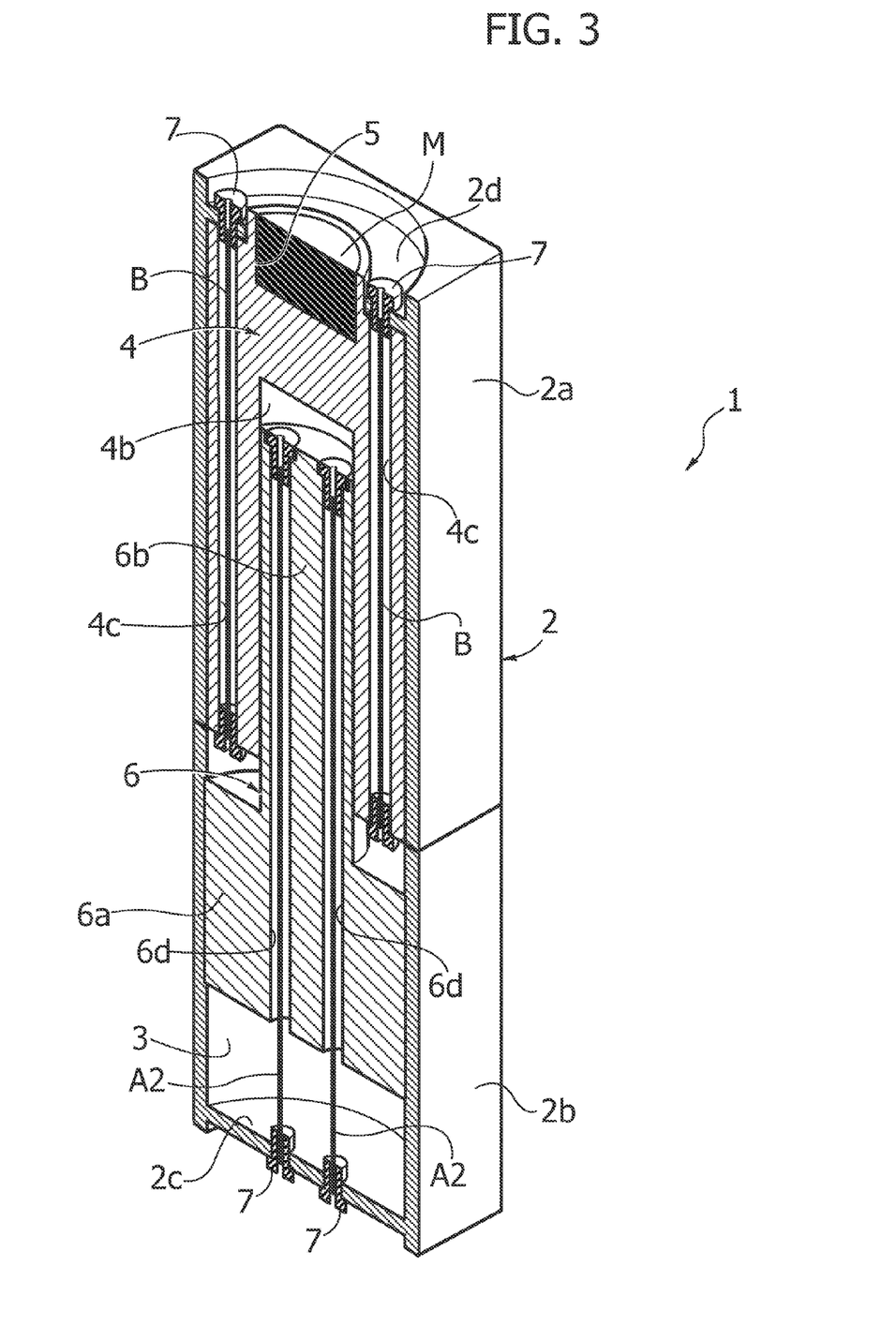

All the shape-memory wires A1, A2 and B are designed to be supplied with electric current (by means of connections not illustrated) by an electronic control unit, illustrated schematically in FIG. 1 and designated by the reference E.

Operation of the device presented above is described in what follows.

When the magnet-holder member 4 is in the advanced position illustrated in FIG. 4, it is able to grip and clamp the sheet L thanks to the magnetic attraction exerted by the main magnet M. In said condition, the electric supply to all the shape-memory wires is deactivated and the position is maintained stably by the magnetic attraction exerted by the main magnet M on the workpiece L.

If, starting from said condition, it is desired to clamp the sheet L, bringing the magnet-holder member 4 into its retracted position, the electronic control unit E is activated so as to govern the supply of electric current through the shape-memory wires A1 and A2. The passage of electric current leads the wires A1 and A2 to exceed their transition temperature so that they undergo a reduction in length, equal to a predetermined percentage of their initial length. The reduction in length of the wires A2 brings about an approach of the auxiliary member 6 to the rear wall 2c of the casing 2, whilst shortening of the wires A1 brings about an approach downwards (as viewed in FIG. 4) of the magnet-holder member 4 with respect to the auxiliary sliding member 6. Consequently, the length of displacement necessary to take the main magnet M from the operative position of FIG. 4 to the inoperative position of FIG. 8 is obtained by means of shortening of the two sets of wires A1, A2 arranged in series with respect to one another. Said solution enables the desired length for the movement of the magnet M to be obtained without entailing an excessive axial dimension of the device, since the total desired shortening is shared between the wires A1 and A2 and since said wires are at least partially set on top of one another in the axial direction, thanks to the arrangement described.

When the magnet-holder member 4 reaches its completely retracted position, the auxiliary magnet m adheres magnetically to the rear wall 2c of the casing 2 so that the electric supply to the wires A1, A2 can be interrupted, and this notwithstanding the fact that the retracted position of the main magnet M is maintained stable.

If, starting from said retracted position, it is desired to reactivate the device for clamping a workpiece L on it again, the electronic control unit E is activated for governing a supply of electric current through the shape-memory wires B. The wires B, by being shortened, bring about a lifting (as viewed in FIG. 8) of the magnet-holder member 4, i.e., a displacement forwards of said member 4 towards the front end of the casing 2. In this case, in the preferred example of embodiment, two sets of wires B arranged in series with respect to one another are not provided in so far as it is sufficient for the magnet-holder member to perform, as a result of shortening of the wires B, even just a part of the total length of the displacement required. The residual part of the displacement is in fact obtained as a result of the magnetic attraction between the main magnet M and the workpiece L set adjacent thereto, it not being possible for the resulting movement to be hindered by the auxiliary magnet m, which gives rise to a magnetic field of intensity considerably lower than that of the main magnet M.

Once the magnet-holder member has returned to its position of maximum displacement forwards, the electric supply to the wires B can be interrupted in so far as said position, as was said at the start, is maintained stable as a result of attraction of the magnet M.

As already mentioned, the number and arrangement of the shape-memory wires can even be altogether different from what has been illustrated herein purely by way of example. Even the use of elements made of shape-memory alloy having a configuration different from that of simple wires, for example in the form of helical springs, is not ruled out. Likewise, the specific conformation of the casing, of the magnet-holder member, and of the auxiliary sliding member can be altogether different.

Furthermore, in the case where no limitations exist on the axial dimension of the device, the auxiliary member may even be eliminated, and shape-memory wires directly connected between the magnet-holder member and the rear end of the casing may be used also for the movement backwards of the magnet-holder member. Furthermore, it is theoretically possible to envisage any different type of mechanism for clamping the magnet-holder member and keeping it stable in each of its two end positions so as to enable interruption of the electric supply after a given position has been reached. In this case, the use of the auxiliary magnet is obviously not necessary. Likewise, it is possible to envisage, for governing the movement forwards of the magnet-holder member, shape-memory elements that cause the magnet-holder member to perform the entire length of movement that is necessary, without resorting to the attraction of the magnet M for completing the last step of movement.

Furthermore, without prejudice to the principle of the invention, the details of construction may vary widely with respect to what has been described and illustrated herein purely by way of example, without thereby departing from the scope of the invention as defined in the annexed claims.

For example, as an alternative to the solution illustrated, heating of the shape-memory elements can be obtained by any alternative heating means, for example by induction heating, PTC elements, and the like.

Furthermore, for simplicity of illustration, the drawings do not show a layer of non-magnetic material (for example, aluminium or synthetic material) that separates the main magnet M from the sheet L. There is moreover provided an electrical insulation between the device 1 and the sheet L, obtained with a coating or element of synthetic material provided on the front end of the device.

It is of course necessary to provide position sensors for determining the position of the main magnet M and of the auxiliary magnet m in order to obtain the feedback signals for control of the device. Said sensors may, for example, be position switches, or contact switches, or Hall sensors.

Preferably, the two shape-memory wires B are provided at their bottom end with springs for recovering the play that is created after contraction. In fact, in the cooling step they are lengthened and enable contraction of the wires A1+A2, which would otherwise work against a constraint. In this way, the workpiece 4 can drop. The springs guarantee maintenance of the electrical contact in addition to mechanical tensioning of the wire.

The invention claimed is:

1. A device for gripping and withholding workpieces made of ferromagnetic material by means of at least one permanent magnet, the device comprising:
   a supporting casing (2);
   a magnet-holder member (4), carrying a main permanent magnet (M) and slidably mounted in the supporting casing (2) between an advanced position, corresponding to an operative position of the main magnet (M), and a retracted position, corresponding to an inoperative position of the main magnet (M);
   actuator means (E, A1, A2, B) carried at least in part by the casing (2), for governing a displacement of the magnet-holder member (4) between the advanced position and the retracted position, the actuator means comprising:
      a first shape-memory actuator elements (A1, A2) for governing a displacement of the magnet-holder member (4) from its advanced position to its retracted position; and
      second shape-memory actuator elements (B) for governing a displacement of the magnet-holder member (4) from its retracted position to its advanced position, the shape-memory actuator elements (A1, A2, B), which are constituted by a shape-memory metal alloy and are designed to undergo a phase transition when their temperature exceeds a predetermined threshold value; and
      means (E) for supplying an electric current through the shape-memory actuator elements (A1, A2, B) so as to bring their temperature above the threshold value, wherein
the magnet-holder member (4) bears the permanent magnet (M) at a front end and moreover bears at a distal end an auxiliary magnet (m), which generates a magnetic field of lower intensity than that of the main magnet (M), the auxiliary magnet (m) adhering to a metal wall (2c) of the casing (2) when the magnet-holder member (4) is in its retracted position so as to keep the magnet-holder member (4) stably in the retracted position even after an interruption of the passage of electric current through the first shape-memory actuator elements (A1, A2), which are used for displacing the magnet-holder member (4) towards the retracted position, wherein the first actuator elements (A1, A2) are selectively adapted to positionally displace the magnet-holder member (4) toward the wall (2c) along an axis (3a) equal to the entire length necessary to pass from the operative position of the main magnet (M) to the position in which the auxiliary magnet (m) is in contact with the wall (2c) of the casing (2), whilst the second actuator elements (B) are selectively adapted to positionally displace the magnet-holder member (4) toward the advanced position along the axis (3e) equal just to a portion of the aforesaid length, the remaining portion of displacement forwards being obtained via the magnetic attraction between the main magnet (M) and the workpiece (L) to be clamped, wherein slidably mounted within the casing (2) is an auxiliary member (6) and wherein the first shape-memory actuator elements (A1, A2) that selectively displace the magnet-holder member (4) toward the wall (2c) comprise a first set of one or more wires (A1) made of shape-memory alloy operatively connected between the magnet-holder member (4) and the auxiliary sliding member (6), and a second set of wires (A2) made of shape-memory alloy operatively connected between the auxiliary sliding member (6) and the rear side of the casing (2) in such a way that the displacement of the magnet-holder member (4) toward the wall (2c) is obtained upon both the movement of the magnet-holder member (4) with respect to the auxiliary sliding member (6), caused by shortening of the shape-memory wires (A1) of the first set, and the movement of the auxiliary sliding member (6) with respect to the casing (2), caused by shortening of the shape-memory wires (A2) of the second set.

2. The device according to claim 1, wherein the second shape-memory actuator elements that selectively displace the magnet-holder member (4) toward the advanced position comprise a third set of one or more wires (B) made of shape-memory alloy operatively connected between the front side of the casing (2) and the magnet-holder member (4).

3. The device according to claim 2, wherein the shape-memory wires (B) of the third set extend through axial cavities (4d) of the magnet-holder member (4) between the front side of the casing (2) and the rear end of the body of the magnet-holder member (4).

4. The device according to claim 1, wherein the wires made of shape-memory alloy (A1) of the first set and the shape-memory wires (A2) of the second set extend through axial channels (4c, 6c, 6d) made through a body of the magnet-holder member (4) and through a body of the auxiliary sliding member (6) and are at least partially set on top of one another in the axial direction.

5. The device according to claim 4, wherein the auxiliary sliding member (6) has a main portion (6a) of a first diameter, mounted so that it can slide within the casing (2) at the rear to the magnet-holder member (4), and a central axial stem (6b) of second diameter mounted so that it can slide within a cylindrical axial cavity (4b) of the magnet-holder member (4), the second diameter smaller than the first diameter, the channels (6d) within which the aforesaid second shape-memory wires (A2) extend being made through the main portion (6a) and through the stem (6b) of the auxiliary sliding member (6) in such a way that the second shape-memory wires (A2) extend between the front end of the stem (6b) of the auxiliary sliding member (6) and the rear side of the casing (2), whilst the shape-memory wires (A1) of the first set extend both through channels (4c) made in the body of the magnet-holder member (4) in the part surrounding the cavity (4b) and through axial channels (6c) made in the main portion (6a) of the auxiliary sliding member (6), externally to the channels (6d) that contain the second shape-memory wires (A2) in such a way that the shape-memory wires (A1) of the first set extend between the front end of the magnet-holder member (4) and the rear end of the auxiliary sliding member (6).

\* \* \* \* \*